US006289742B1

(12) United States Patent
De Angelis

(10) Patent No.: US 6,289,742 B1
(45) Date of Patent: Sep. 18, 2001

(54) METHOD AND APPARATUS FOR DETECTING DAMAGE TO A SHEATH OF A SYNTHETIC FIBER ROPE

(75) Inventor: Claudio De Angelis, Luzern (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 09/488,304

(22) Filed: Jan. 20, 2000

(30) Foreign Application Priority Data

Jan. 22, 1999 (EP) .......................................... 99810049

(51) Int. Cl.[7] .......................................... G01N 3/08

(52) U.S. Cl. .......................................... 73/835; 73/158

(58) Field of Search .......................... 73/834, 835, 826, 73/862.393, 862.392, 158, 160

(56) References Cited

U.S. PATENT DOCUMENTS 5,015,859 * 5/1991 Uejio .................................. 250/358
5,131,064 * 7/1992 Arroyo et al. ...................... 385/102
5,605,035 * 2/1997 Pethrick et al. ...................... 57/200
5,834,942 11/1998 De Angelis .

FOREIGN PATENT DOCUMENTS 684029 1/1967 (BE) .
0 731 209 9/1996 (EP) .

* cited by examiner

*Primary Examiner*—Max Noori
(74) *Attorney, Agent, or Firm*—MacMillan, Sobanski & Todd, LLC

(57) ABSTRACT

An apparatus and method for the detection of damage to a rope sheath of a sheathed synthetic fiber rope includes at least one breaking element covered by the sheath and extending along the rope. If the breaking element is damaged, a predetermined detectable characteristic thereof changes indicating likely damage to the rope sheath. The number and spacing of the breaking elements can be selected to determine the extent of localized damage to be detected. A control device monitors the breaking element to detect rope damage should it occur, and initiates suitable measures should they be necessary.

12 Claims, 2 Drawing Sheets

METHOD AND APPARATUS FOR DETECTING DAMAGE TO A SHEATH OF A SYNTHETIC FIBER ROPE

BACKGROUND OF THE INVENTION

The present invention relates to an apparatus for damage detection for the rope sheath of a synthetic fiber rope.

A synthetic fiber rope is a textile product made from rope threads of natural or chemical fibers, the rope being manufactured by twisting or otherwise forming, by laying in two or more stages with or without sheathing, or by braiding. The rope sheath protectively surrounds the rope structure of so-called synthetic fiber strands and, in the case of driven ropes, creates the necessary tractive capacity. It consists preferably of abrasion-resistant synthetic material, and is connected to the outermost layer of strands by adhesion and/or direct mechanical means. Either the rope sheath surrounds the rope in its entirety, or the outermost rope strands are each surrounded by a sheath of synthetic material and these together form the rope sheath. Especially when the ropes run over pulleys, and/or are driven, the rope sheath is subject to high abrasive wear.

The European patent 0 731 209 shows that a sheathed synthetic fiber rope is known as a suspension element for elevators. To ascertain the state of wear of the rope sheath on this driving rope, the rope sheath has different colors arranged coaxially. At an appropriate amount of wear of the sheath, the underlying color becomes visible, which is then taken to indicate the presence of advanced wear of the rope. This indication of damage has proved its value in relation to effects of wear in the rope sheath, but it is of only limited suitability for the reliable detection of localized damage due, for example, to unintentional contact with sharp edges or the like.

SUMMARY OF THE INVENTION

The problem therefore presents itself of specifying a damage detection device for a rope sheath that reliably detects damage to the rope sheath irrespective of the cause of the damage. This problem is solved by the present invention that concerns an apparatus and a method for the detection of damage to the rope sheath of a synthetic fiber rope. As a result of a breaking element inserted in the rope sheath, permanent monitoring of the rope sheath by measurement is possible. For this purpose, a signal is transmitted through the breaking element over a specific length of rope. If this connection is broken, the rope sheath has been damaged from the outside. By monitoring in real time, visual inspection only becomes necessary when the monitoring device detects damage to the rope sheath.

The breaking element can take the form of an electric conductor, an optical fiber cable, or the like. Of importance for the selection of the conducting material used for this purpose is a fatigue strength under reverse bending stress which at least matches that of the rope construction so that material failure due to operation is ruled out.

The breaking element can, for example, be constructed as an electric conductor in the form of a carbon fiber or metal wire through which a control signal is sent. If the conducting connection is cut off, no signal is transmitted, and this can be indicated in a suitable manner.

In combination with a monitoring device, damage to the rope sheath can be detected by the control, and appropriate measures to ensure safe operation of the elevator can be initiated without delay.

The breaking element is preferably wrapped around the entire rope, or the strands of the outer layer, and covered by the rope sheath, which is preferably applied by an extrusion process. Further, with an embodiment having a two-layered rope sheath, the breaking element can be positioned on the inner layer of the rope sheath and covered by the second layer of the rope sheath. In this way, the breaking element is completely embedded in the rope sheath and additional lateral forces acting on the synthetic fiber strands as the rope runs over pulleys are avoided.

In another preferred embodiment, several breaking elements are embedded in the rope sheath around the rope parallel to the strands and/or in the direction of the length of the rope. This has the advantage of the rope sheath being monitored over practically its entire surface area with regard to mechanical damage taking place from outside.

Furthermore, embodiments of the invention in which the breaking element is made from high strength material afford the additional advantage of strengthening or reinforcing the rope sheath. This can be used to improve the rope's fatigue strength under reverse bending stress as well as its abrasive wear behavior.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
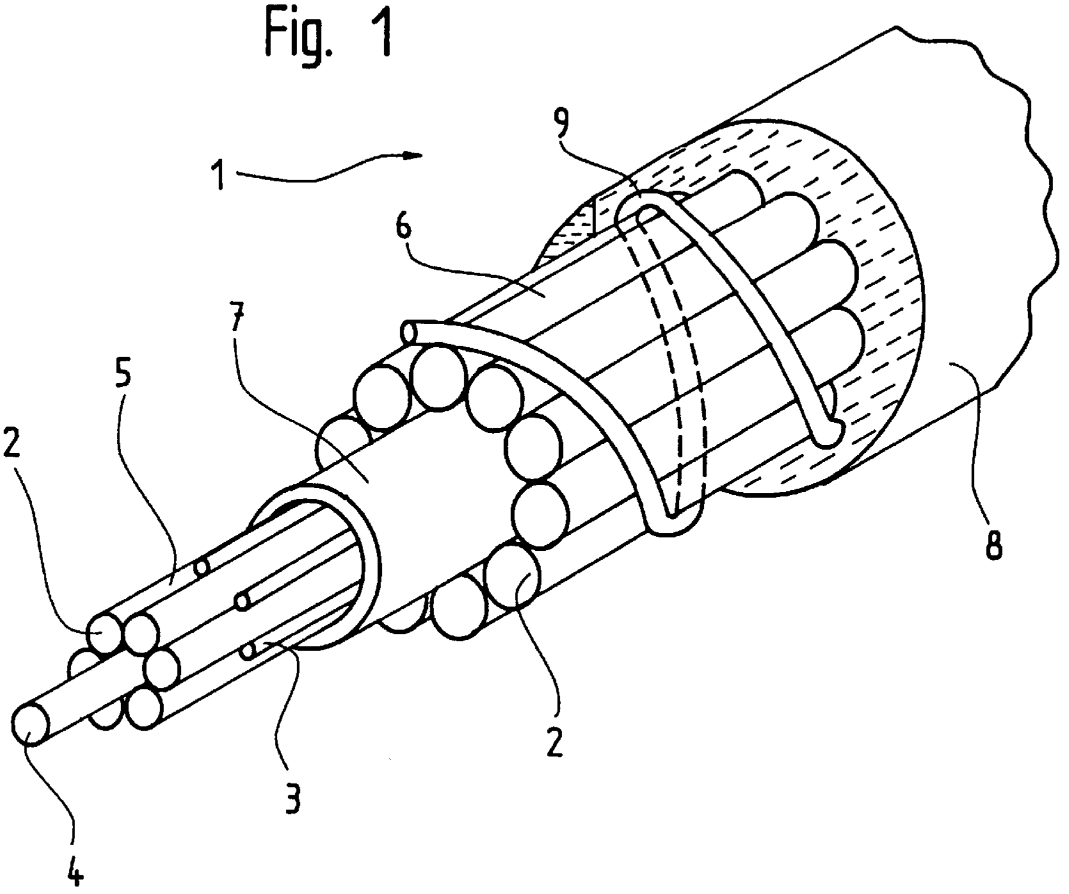
FIG. 1 is a perspective view of a multi-layered aramide fiber rope with a conducting element in accordance with the present invention, the conducting element being wound helically round the rope and embedded in the rope sheath.

The perspective drawing FIG. 1 shows the construction of a sheathed aramide fiber rope 1 of aramide fiber strands 2, which together with filler strands 3 are arranged in layers around a core 4. Positioned between an inner layer of strands 5 and an outermost layer of strands 6 is an antifriction intersheath 7 preferably having a contoured surface. The outermost layer of strands 6 is covered by a rope sheath 8, which is preferably of polyurethane or polyamide. Here, a breaking element 9 in the form of a copper wire is wound helically around the outermost layer of strands 6 over the entire length of the rope 1 with a gradient 10 (FIG. 2) of, for example, 1–4 turns per 60 mm length of rope. The rope sheath 8 is extruded onto the copper wire breaking element 9 so that the copper wire is embedded in the rope sheath material and thereby covered. While discussed in terms of a copper wire, the breaking element 9 can be any suitable device having a detectable characteristic that changes in response to physical damage. For example, various types of electrical current carrying wires and fiber-optic cables can be used.

When several breaking elements arc used these can, in principle, be arranged within the rope sheath in any desired manner on the rope provided that they create a connection for carrying signals over a specific length of rope and that mutual contact between the breaking elements through material of the rope sheath surrounding them is ruled out.

Instead of being wound around the rope 1, the copper wire 9 can also be embedded in the rope sheath 8 parallel to the aramide fiber strands 2 of the outermost layer of strands 6. However, with such a parallel arrangement, it is expedient to distribute a large number of copper wires evenly over the circumference of the rope 1, so as to achieve monitoring of the rope sheath 8 over as nearly as possible its entire area. This arrangement is especially advantageous when the rope has a twisted or laid construction, because then the angle of lay causes the copper wires 9—or breaking elements in general—to be at an angle to the direction of motion of the driven rope 1 with the result that an object, such as a sharp edge, rubbing along the length of the driven rope 1, unavoidably cuts through the copper wire or wires and this is immediately recognized as damage.

Figure 2:
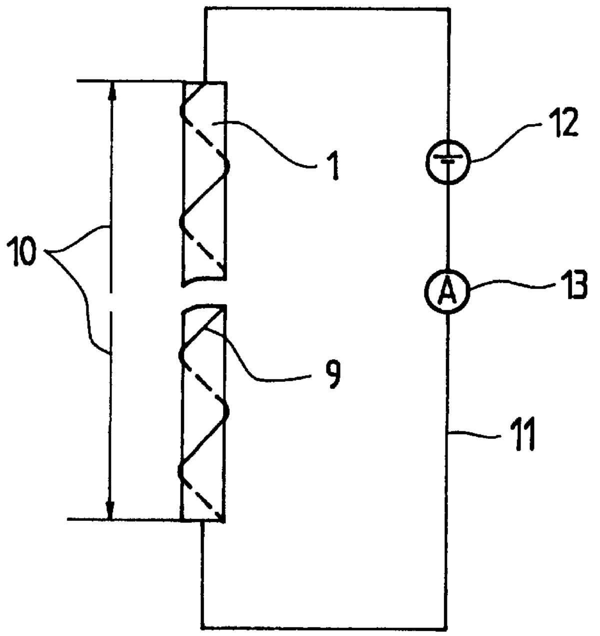
FIG. 2 is a schematic diagram of a monitoring circuit for the aramide fiber rope illustrated in the FIG. 1.

FIG. 2 illustrates the monitoring by measurement of the aramide fiber rope shown in FIG. 1. To check whether the conducting connection created by means of the breaking element(s), here the copper wire 9, is intact over the length of the rope 10, or a specific section of the length, an electric voltage, for example in a monitoring circuit 11, can be applied to the two ends of the breaking element. A suitable source of voltage for this purpose is a battery 12 or a voltage generator. An ammeter 13 can then be used to detect whether a current is flowing through the copper wire 9 or not. The battery 12 and the ammeter 13 are shown as being connected in series with the copper wire 9, but could be connected in any suitable manner to achieve the monitoring function.

Instead of the ammeter 13, a control lamp (not shown) can be connected in the current circuit which, depending on how it is connected, is either illuminated or extinguished when damage occurs.

Figure 3:
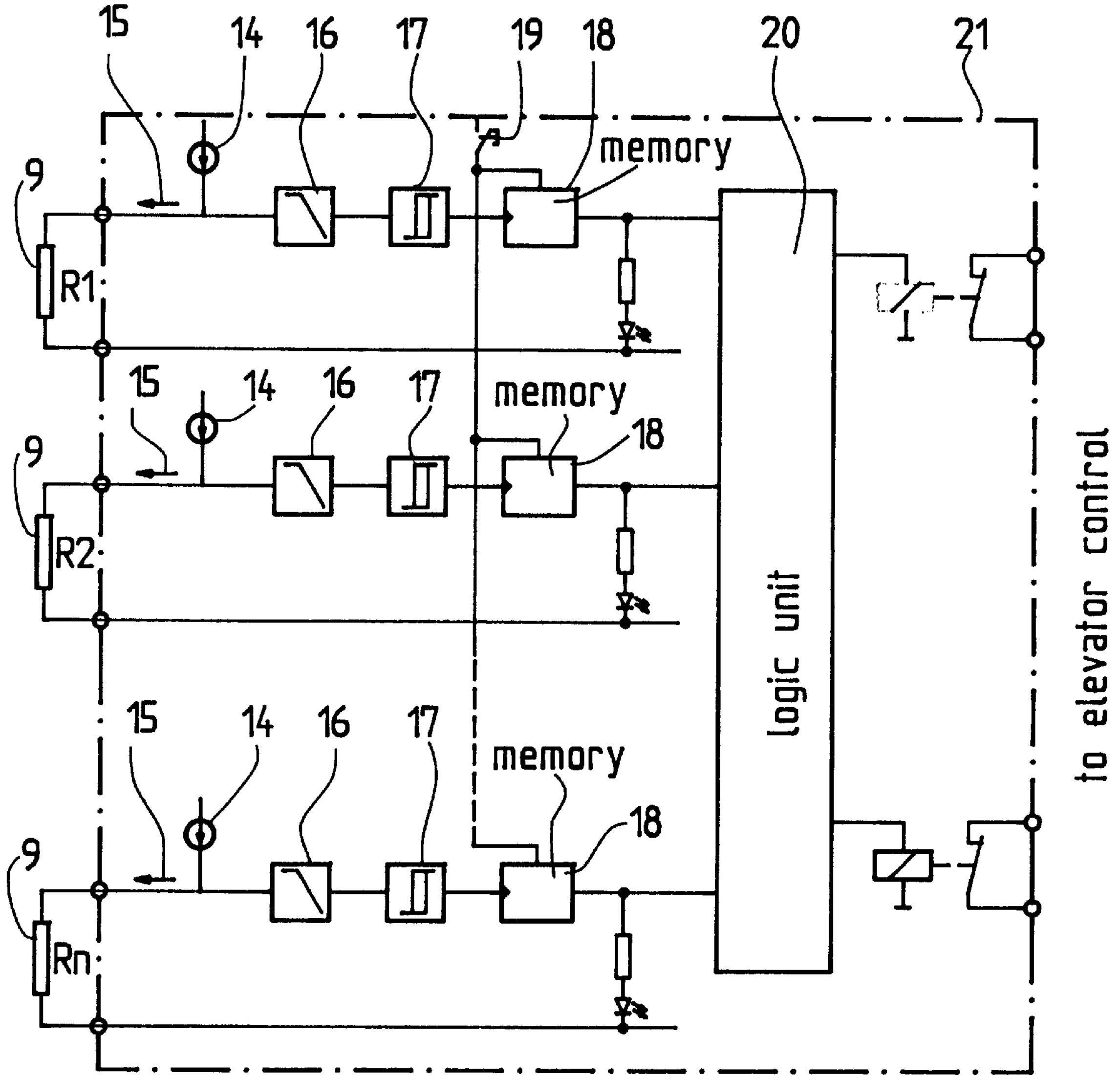
FIG. 3 is a schematic diagram of an elevator control circuit according to the present invention.

Furthermore, damage to the rope sheath 8 can be detected with the aid of a control circuit 21 in the monitoring circuit 11. An example of a circuit suitable for this purpose is known from European patent document 0 731 209 A1. In this known control circuit 21, which is illustrated in FIG. 3, a constant current 15 is fed into the breaking element or elements 9 from a source of voltage 14 for which the associated breaking element represents a resistance identified as Rl to Rn. A low-pass filter 16 filters the incoming impulses and transmits them to a threshold switch 17. The threshold switch 17 compares the measured voltages. When certain limit values are exceeded, i.e. due to the associated breaking element 9 being cut through, the resistance becomes so high that the allowable value of the voltage is exceeded. This exceeding of the limit value is stored in a non-volatile memory 18. This memory 18 can be cleared by means of a reset button 19. Otherwise, the memory 18 passes on its information to a logic unit 20 that is connected to the elevator control.

Each breaking element 9 is correspondingly connected by cables and permanently monitored. As soon as damage occurs, the elevator control switches the elevator off, taking the elevator car to the evacuation position and holding it there.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A synthetic fiber rope comprising:

a plurality of synthetic fiber strands forming a rope body having a length and an outer circumferential surface;

a rope sheath covering said synthetic fiber strands along the length and about the outer circumferential surface; and at least one breaking element extending along the length of said rope body external of the outer circumferential surface and being covered by said rope sheath, said breaking element having a predetermined detectable characteristic whereby when said rope sheath is damaged sufficiently to break said breaking element, said predetermined detectable characteristic changes to indicate a presence of the damage to said rope sheath.

2. The rope according to claim 1 wherein said breaking element is an electrically conducting wire wound about said rope body and said predetermined detectable characteristic is electrical resistance.

3. The rope according to claim 1 wherein said breaking element is a fiber-optic cable wound about said rope body and said predetermined detectable characteristic is light transmission.

4. The rope according to claim 1 wherein said breaking element is embedded in said rope sheath.

5. The rope according to claim 1 wherein said breaking element is wound about said rope body a predetermined number of turns per unit length.

6. The rope according to claim 5 wherein said breaking element is wound in a range of from one to four turns per 60 mm length of said rope body.

7. The rope according to claim 1 wherein said breaking element is connected to a source of electrical power and to means for monitoring current flow through said breaking element, said means for monitoring current flow indicating the current flow as said predetermined detectable characteristic.

8. The rope according to claim 1 including a control circuit connected to said breaking element for generating a control signal in response to the change in said predetermined electrical characteristic.

9. An apparatus for controlling an elevator system in response to damage to a sheath of a synthetic fiber rope supporting an elevator comprising:

a plurality of synthetic fiber strands forming a rope body having a length and an outer circumferential surface;

a rope sheath covering said synthetic fiber strands along the length and about the outer circumferential surface, said rope body and said rope sheath forming a synthetic fiber rope;

at least one breaking element extending along the length of said rope body external of the outer circumferential surface and being covered by said rope sheath, said breaking element having a predetermined detectable characteristic whereby when said rope sheath is damaged sufficiently to break said breaking element, said predetermined detectable characteristic changes to indicate a presence of the damage to said rope sheath; and a control circuit responsive to said change for generating a control signal for use by an elevator control to stop operation of an elevator car supported by said synthetic fiber rope.

10. A method of detecting damage to a sheath of a synthetic fiber rope comprising the steps of:

a. providing at least one breaking element extending along a length of and external to an outer circumferential surface of a rope body formed from a plurality of synthetic fiber strands;

b. covering the rope body and the breaking element with a rope sheath;

c. monitoring a predetermined detectable characteristic of the breaking element for a change indicating a presence of damage to the rope sheath; and d. generating a control signal upon detection of the change in the predetermined detectable characteristic.

11. The method according to claim 10 wherein the predetermined detectable characteristic is one of electrical resistance and light transmission.

12. The method according to claim 10 wherein said step a is performed by winding the breaking element about the rope body a predetermined number of times per unit distance.

* * * * *